L. F. DILLON.
CAN HANDLING MACHINE.
APPLICATION FILED JUNE 12, 1915.

1,266,666.

Patented May 21, 1918.
4 SHEETS—SHEET 1.

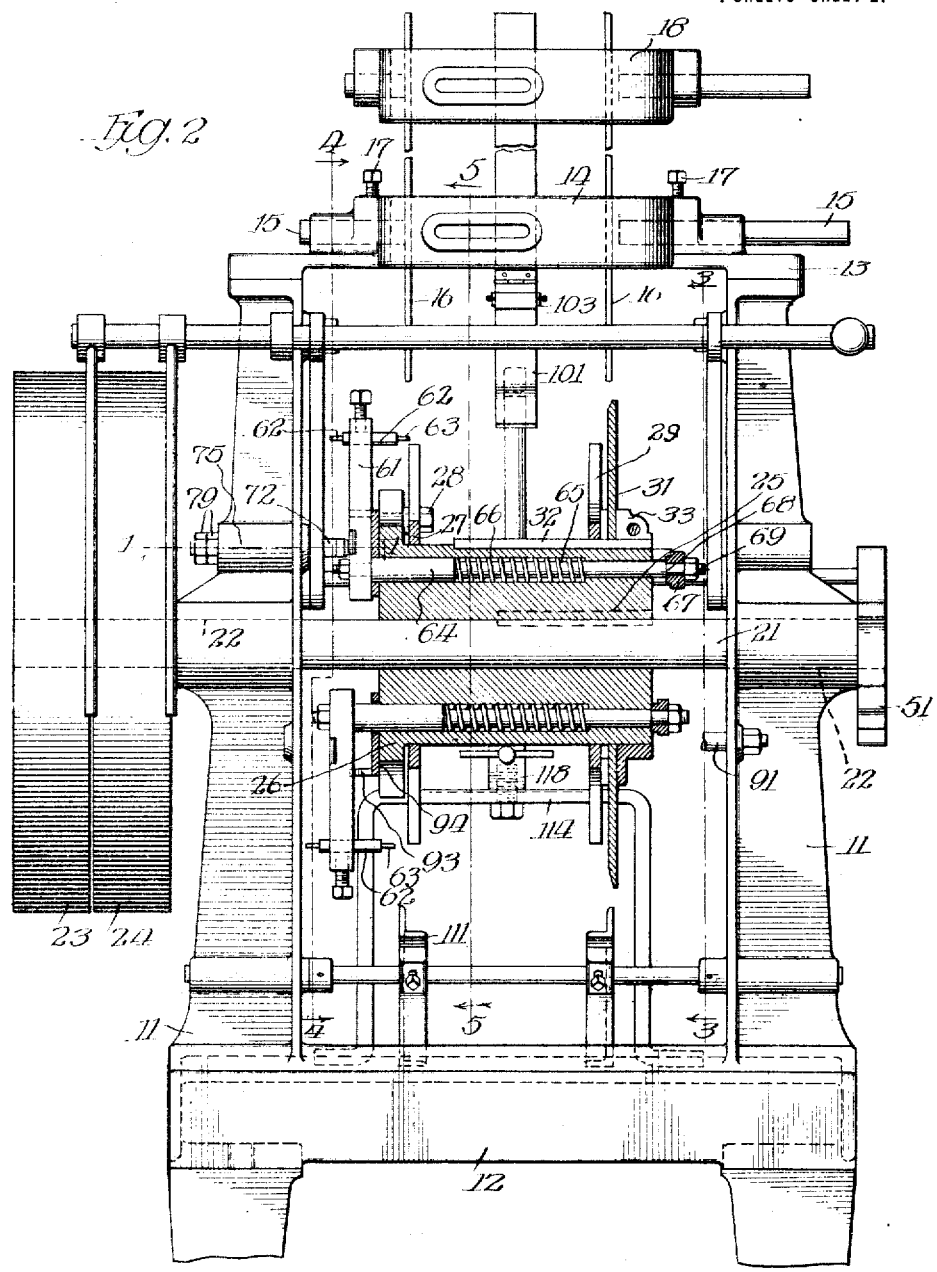

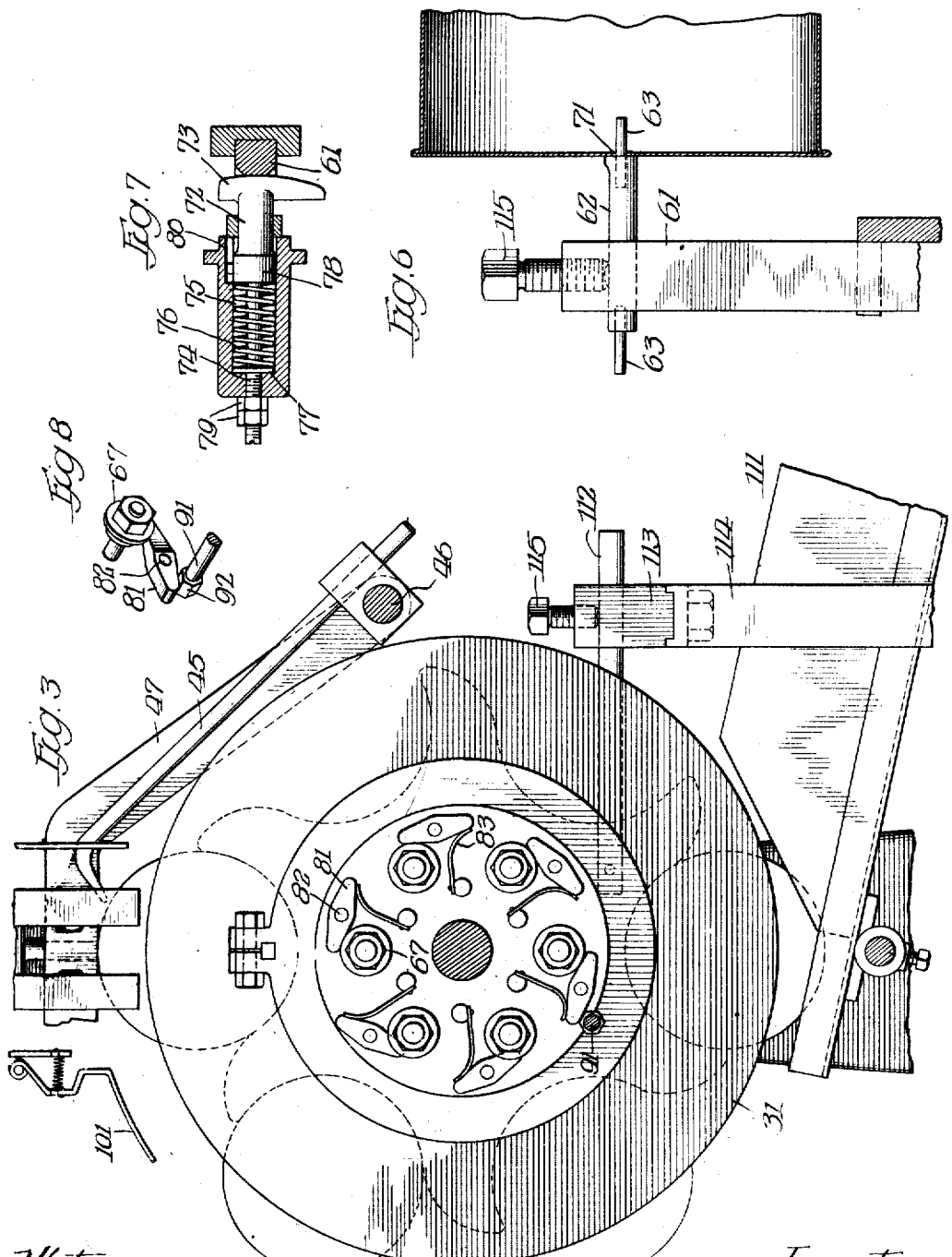

L. F. DILLON.
CAN HANDLING MACHINE.
APPLICATION FILED JUNE 12, 1915.
1,266,666.
Patented May 21, 1918.
4 SHEETS—SHEET 4.
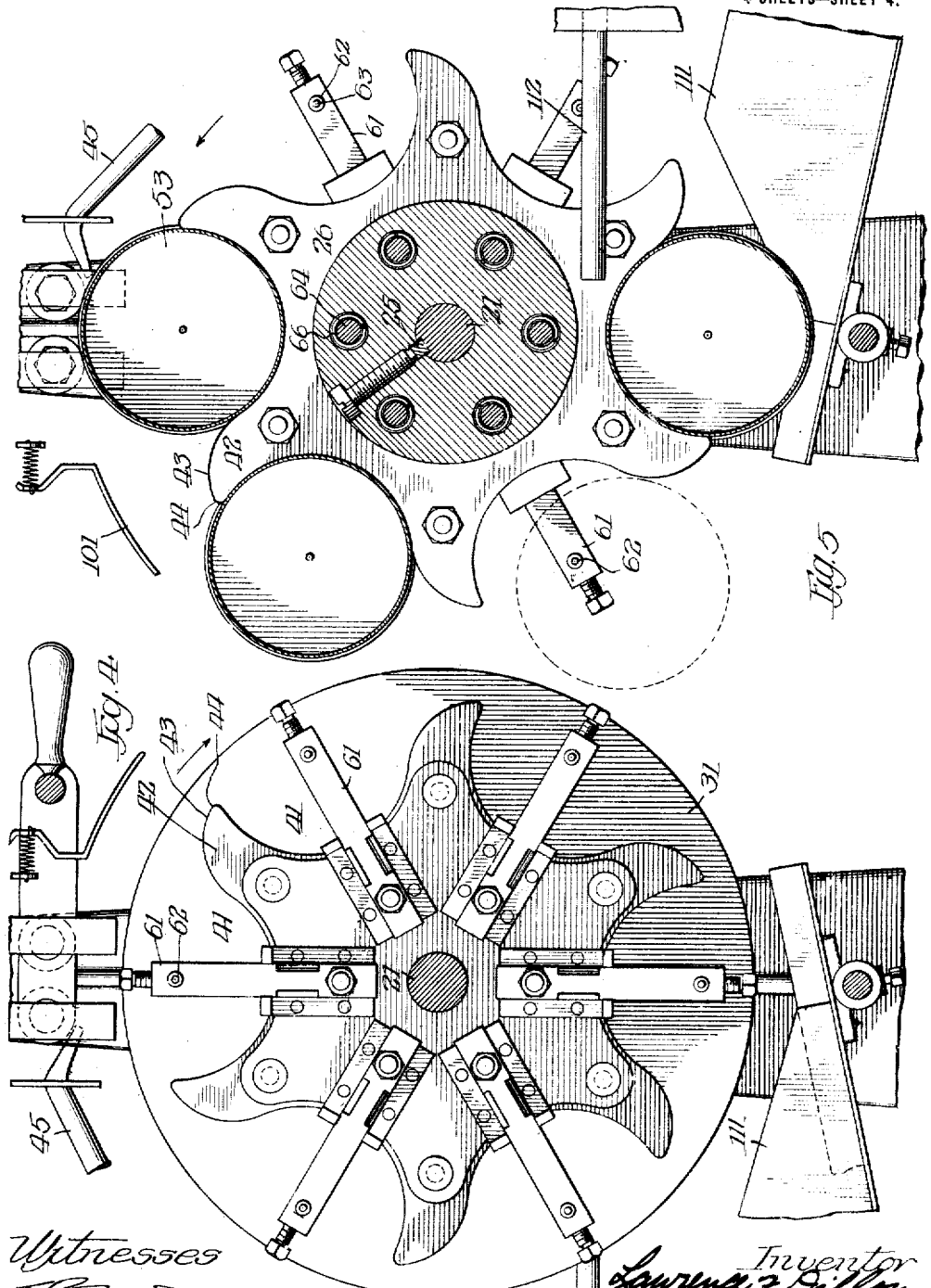

UNITED STATES PATENT OFFICE.

LAURENCE F. DILLON, OF MELROSE PARK, ILLINOIS, ASSIGNOR TO AMERICAN CAN COMPANY, OF NEW YORK, N. Y., A CORPORATION OF NEW JERSEY.

CAN-HANDLING MACHINE.

1,266,666.

Specification of Letters Patent.

Patented May 21, 1918.

Application filed June 12, 1915. Serial No. 33,704.

*To all whom it may concern:*

Be it known that I, LAURENCE F. DILLON, a citizen of the United States, residing in Melrose Park, in the county of Cook and State of Illinois, have invented a new and useful Improvement in Can-Handling Machines, of which the following is a specification.

This invention relates in general to can handling machines and has more particular reference to machines adapted for the handling of cans to determine their proper relation and to sort out such cans as are in improper relation or improperly constructed in certain particulars.

In the making of tin cans it is generally the custom to construct the can bodies and head them by automatic machinery, the heads and bodies being fed in frequently in part at least by hand. In the formation of the vent hole can, that is to say, the can provided with a small opening in its top through which its contents is to be received and which is later closed to seal the can, sometimes the hand feeding of the ends has resulted in the provision of two completely closed ends. Where cans of this character are tested for leaks they are carried through suitable chutes to the testing machine and not infrequently become reversed end for end in the chutes. If they enter the testing machine with a closed end where an open end should be, no testing of the can results. The testing machine consists of a clamp between which the ends of the can are held, the portion of the clamp engaging upon the open end forming a seal therewith and resulting in the forcing of compressed air into the can. The compressed air is forced into the can while the can is under water and any leaking is immediately apparent. If the can be provided with two open ends the result in the testing machine is the same as though the connections between the ends and the body were imperfect. But if it be provided with two closed ends they pass undetected. If the cans though properly constructed are merely reversed in position no testing results and a further evil is present in that the cans retaining heat from the soldering machine cause the production of partial vacuums when immersed in the colder water, resulting frequently in the lodging of an appreciable quantity of water within the can which later interferes with the filling of the can in an accurate measuring machine.

It is a principal object of this invention to insure that all of the cans entering the testing machine will have open ends presented to the compressed air portions of the testing clamps. To this end my invention contemplates the ejectment by the handling machine of all cans which are not open at the end which will later be grasped by a compressed air part of the can testing machine.

A further object of the invention is the provision of a can handling machine which will permit the passage of cans through it continually and without interruption to their passage from the end applying machine to the testing machine. Certain features of the invention have, however, a wider application, as will be readily apparent as the invention is better understood.

Other objects and advantages of the invention will be apparent as it is better understood from the following description when considered in connection with the accompanying drawing illustrating a preferred embodiment thereof.

Referring to the drawing—

Fig. 2 is a side elevation thereof with parts shown in section;

Fig. 3 is an end view of a pocket-forming member taken substantially on the line 3—3 of Fig. 2;

Fig. 4 is a similar view taken substantially on the line 4—4 of Fig. 2;

Fig. 5 is a similar view taken substantially on the line 5—5 of Fig. 2;

Fig. 6 is a detail showing the arrangement of the can entering and holding devices;

Fig. 7 is a detail view of the yieldable stop.

Fig. 8 is a detail showing the arrangement of a locking device.

Figure 1:
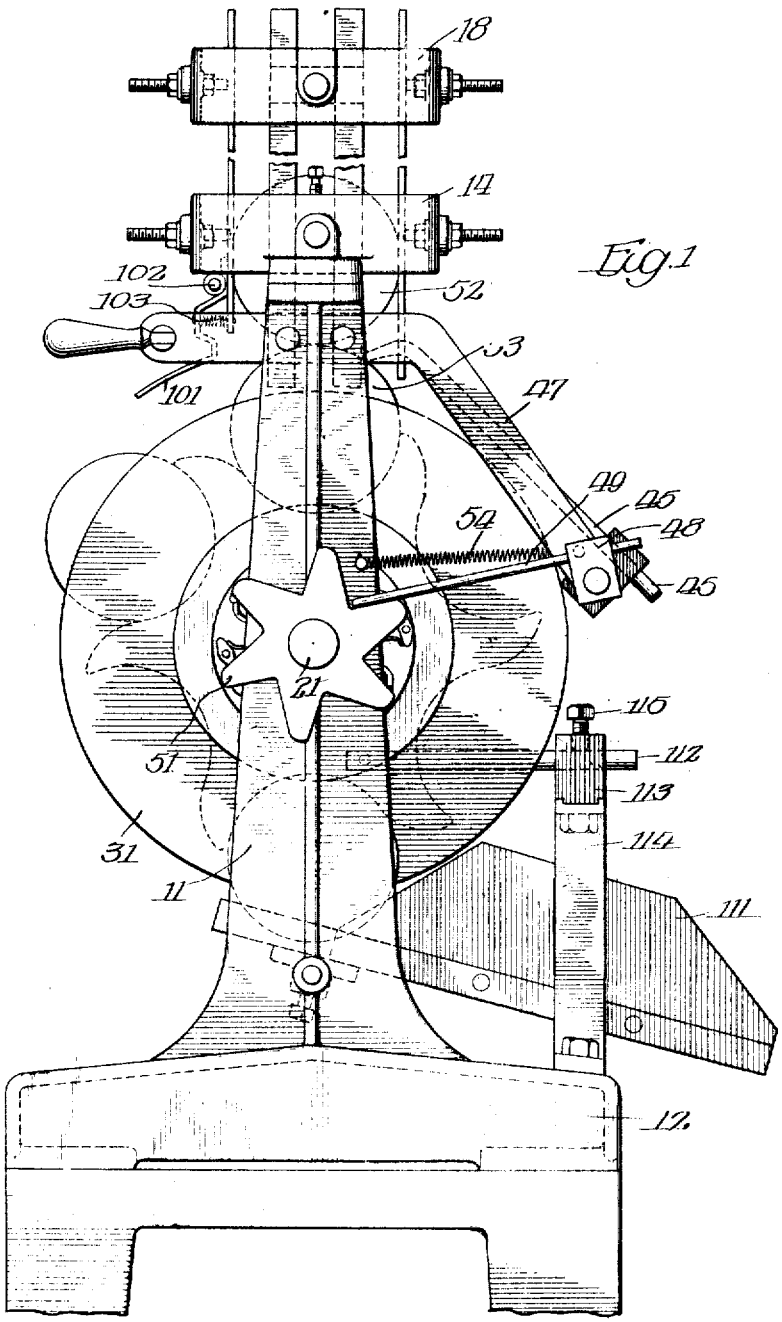
Figure 1 is a side elevation of a can handling machine embodying my invention.

The various parts of my invention shown on the drawing are mounted in a suitable framework consisting, in the present instance, of a pair of uprights 11 extending upwardly from a suitable base 12 which uprights and which base may have any preferred construction. These uprights support at their top a cross member 13 which, forms the lower end of a can receiving chute. This member is in the form of a yoke 14 through which at suitable points extend shafts or carrying rods 15 to the end of which are secured can guides 16. These guides are rendered adjustable through movement of their carrying rods 15 in the yoke, set screws 17 being provided to hold them in adjusted relation. Other and similar yokes 18 may be provided if desired. The cans are delivered through the chute continuously.

As they leave the chute they are received by a pocket-forming device in which they repose. This device is mounted upon a shaft 21 taking through suitable bearings 22 in the standards or uprights 11 and having at an end idle and driving pulleys 23 and 24. Between the uprights a relatively thick collar 25 is keyed upon this shaft to turn therewith. This collar has at one side an outwardly extending flange 26 against which one of the pocket-forming elements 27 is secured as by bolts or other suitable means 28. A second pocket-forming element 29 fastened rigidly with a back plate 31 is also provided upon the collar 25. This pocket forming element is movable longitudinally of the collar upon a feather 32 and may be clamped in position through a locking ring 33. The two pocket-forming elements or members provide a plurality of pockets adapted to be positioned at the bottom of the chute in continuous succession. The pockets indicated at 41 are defined by partitions 42 each of which has its rearward edge cut away on a curve 43, it being the intention that the cans delivered by the chute shall first engage the partitions and be rolled down into the pockets in the operation of the machine. The partitions are so arranged that cans in contact may be received from the chute, the points 44 of the partitions separating them so that they enter successive pockets. In order that the succession of the cans may be appropriately started and thereafter not interfered with unless interruption to the succession occur, I provide a stop lever or arm 45 which is projected into the path of travel of the cans but between them when in contact, being removed before the lowering body reaches the travel of the arm. This arm is mounted on a shaft 46 having bearings in arms 47 from the frame and carrying at the end remote from the driving pulley a block 48. In this block is an eccentrically mounted pin 49 which rests upon a toothed wheel 51 carried upon the end of the shaft 21, the teeth in this wheel corresponding with the number of pockets in the pocket carrying member or members. These teeth are arranged so that the arm may extend inwardly in the position shown in Fig. 1 when the cans are located with their contacting surfaces at or adjacent this point, further movement of the shaft lifting it out of the way so that the next can thereabove will not be interrupted in its movement. This arrangement may be better appreciated perhaps through observing the relation of the two cans 52 and 53 in Fig. 1. A spring 54 is provided for holding the pin 49 against the toothed wheel 51.

After each can is received in its pocket a combined entering and holding device engages it if it be arranged with its open end toward the right, viewing Fig. 2. One of these devices is provided for each pocket and a description of one of them will suffice for the others. The device in the present instance consists of a radially disposed arm 61 through the outer end of which is provided a bar 62 having at its ends pins 63 adapted to enter the holes in the ends of the cans, two such pins being provided on each bar in order that the bar may be reversed in position should one pin be broken. The arm 61 is secured at its inner end to a shaft 64 which extends through the collar 25. This shaft has an enlargement at its end adjacent the arm 61 and the aperture 65 through which it extends is larger at this end than at the other. Positioned in this aperture and between the entering end of the enlarged portion and the adjacent end of the enlargement of the shaft 64 is a spring 66 normally pushing the arm 61 toward the left, viewing Fig. 2. Movement in this direction is limited by a collar 67 upon the end of the shaft 64 which is held between a shoulder 68 and a nut 69. The normal position of the arm is that shown in the lower part of Fig. 2 which is its position on the return part of the travel of the pocket-forming member. The pin 63 is forced into the end of the can as shown in Fig. 6 if the vent aperture 71 be presented thereto and this pressure is exerted by means of a yielding stop 72, the details of which may be observed from Fig. 7. Viewing this figure it will be noted that the stop 72 has an enlarged head 73 and a stem 74 taking through a chambered bearing 75 in the left hand upright 11, viewing Fig. 2. A spring 76 is provided in this chamber and bears against its closed end 77 and against a head 78 on the stem 74. Movement of the stem under influence of the spring, is restrained by nuts 79 screwed thereon. After a can has rolled into its pocket slight further movement of the pocket-forming members brings the arm 61 of this combined entering and holding device under the head 73 of the stop. This presses the arm 61 toward the can and if an aperture 71 is presented to the pin 63 the pin enters and the can is held in place. If, however, no aperture is present the strength of the spring 76 is overcome by pressure exerted upon the can body and by the pressure of the spring 66 about the rod 64 of the arm 61.

As each pin enters a can the holding device is locked in place. This is accomplished by locking dogs 81 mounted upon pivot pins 82 adjacent the collars 67 already described. A spring 83 presses these dogs about their pivots so that they enter behind the collars and prevent retraction under the force of the spring 66 when the holding device has passed beyond the influence of the head 73. This head is given the elongated form shown in order that the locking devices may have time to enter as described, and rotation of it is prevented by a pin and slot connection 80.

Once having been locked in place by the locking device the cans in which the pins 63 have entered are carried through an angular movement of the conveyer past the point at which they would roll out were they unrestrained. In the present instance this movement is substantially 180° so that the pockets are inverted while holding the cans. Release of the locking devices is accomplished by a pin 91 having a hexagonal head 92 and secured in the right hand upright 11, viewing Fig. 2. This pin engages the rear end of the dog and lifts it from behind its collar 67 so that the spring 66 may move the combined entering and holding device to inoperative position. These devices are guided in this movement by arms 93 extending up from a plate 94 against which the device rests when in operative position. Should the cams fail to be properly deposited in the pockets jamming is prevented by a guide 101 mounted upon the forward part of the chute. This guide is pivoted at 102 and is held inwardly by a spring 103 so that the cans are caused to roll down into the pockets unless resistance is presented, in which event the can will move the guide outwardly and fall outside the machine. The cans that are not engaged by the pins drop from their pockets, as indicated in Fig. 5, before arriving at the normal discharge position. When unlocked the cans which are properly arranged fall in a chute 111 down which they may travel to the can testing machine. A bar 112 carried from a movable head 113 upon standards 114 is positioned to extend behind the pocket forming members 27 and 31 to cause positive ejectment of any cans that stick. This bar may be adjusted as desired through suitable screws 115.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:—

1. A can handling machine comprising, in combination, members forming horizontal open-sided and invertible pockets, can holding members adapted to enter the open ends of cans resting in said pockets with their open ends disposed toward one side of said machine, and a member for receiving cans held by said holding means.

2. A can handling machine comprising, in combination, invertible can pocket forming members, a yielding member adapted to engage a can resting in said pocket with the open end disposed in predetermined position, locking means operated through the entrance of said member into the open end of the can and means for releasing said locking member at a predetermined point in the travel of said can pocket forming members.

3. A can handling machine comprising, in combination, a rotatable member provided with pockets for receiving the cans, a can holding member positioned adjacent each pocket and rotatable therewith, yielding means for moving said member against a can end and into the end if the end be open, and means for locking such members as they enter the cans in position through a predetermined travel of said rotatable member.

4. A can handling machine comprising, in combination, a rotatable pocket providing member, a can selecting member adapted to enter the open end of a can in a pocket, and locking means operated by said member for preventing release through a predetermined travel of the can in the open end of which said member has entered.

5. A can handling machine comprising, in combination, an invertible pocket, a can holding member movable in a direction parallel with the axis of the pocket toward said pocket and into the open end of a can resting in proper position therein, and yielding means for moving said member.

6. A can handling machine comprising an invertible pocket, a can holding member movable toward said pocket and into the open end of a can properly arranged therein, a yielding member for pushing said can holding member into the open end of a can or against a closed end, and means for locking said holding member in holding position in the open end of the can properly arranged in said pocket while said member is under the influence of said yielding means.

7. A can handling machine comprising an invertible pocket, a can holding member movable toward said pocket and into the open end of the can properly arranged therein, a yielding member for pushing said holding member into the open end of a can or against a closed end, means for locking said member in holding position in the open end of the can properly arranged in said pocket while said member is under the influence of said yielding means, and means for releasing said locking means at a predetermined point in the travel of said pocket.

8. A can handling machine comprising, in combination, invertible can pocket providing members, holding devices adapted to enter the open ends of cans presented toward a side of the machine, said devices being movable with said pockets, relatively stationary means for moving said devices into cans having open ends disposed thereto, locking members for holding said devices in operative position and movable with said pockets, and relatively stationary means for releasing said locking devices at a predetermined point in the travel of said pocket providing members.

9. A can handling machine comprising, in combination, invertible pocket providing members, a can entering and holding device positioned adjacent each pocket and movable with said pocket forming members, said device being carried on a spring-held stem normally retaining said device in inoperative position, means for pushing said device against the action of the spring in said stem into the open end of a can properly arranged in said pocket, and means for retaining said device in position through a predetermined travel of said pocket.

10. A can handling machine comprising, in combination, invertible pocket providing members, a can entering and holding device positioned adjacent each pocket and movable with said pocket forming members, said device being carried on a spring held stem normally retaining said device in inoperative position, spring pressed means for pushing said device against the action of the spring in said stem into the open end of a can properly arranged in said pocket, and means for retaining said device in position through a predetermined travel of said pocket.

11. A can handling machine, comprising, in combination, invertible pocket providing members, a can entering and holding device positioned adjacent each pocket and movable with said pocket forming members, said device being carried on a spring held stem normally retaining said device in inoperative position, a spring pressed member for pushing said device against the pressure of the spring in said stem through a predetermined portion in the travel of said pocket forming members, and means for retaining said device in position through a predetermined travel of said pocket.

12. A can handling machine comprising, in combination, pocket forming members providing curved partitions between said pockets down which the cans roll into successive pockets, and means for delivering cans thereto, combined with axial can holding rods at the ends of said pockets.

13. The combination of a can carrier rotary on a horizontal axis and having peripherally arranged can pockets, a can chute leading to the upper side of said carrier in which chute the cans descend by gravity one resting on another, a can stop arranged in opposition to those sides of the pockets along which the cans descend into the pockets so as to control the cans successively when they enter the pockets, and means for moving said stop against the can being seated and thereafter out of the path of the succeeding cans in the chute.

14. A can handling machine comprising, in combination, a member providing successive can receiving open-sided pockets, means for locking said cans in said pockets, and a movable guide extending over the pockets when they are in a predetermined position for permitting the ejectment of misplaced and unsecured cans.

15. A can handling machine comprising, in combination, a continuous succession of pockets, said member comprising a plurality of pocket forming parts adjustable as to length, means for holding said parts in fixed adjustment, and a can delivering device for depositing cans in said pockets, said device being adjustable according to the length of the cans.

16. In a can sorting mechanism for can testing machines, the combination of a movable invertible can receiving pocket from which cans may be discharged at different points, a movable can testing pin adapted to enter and hold in place a properly constructed and presented can, and means for operating said pin in directions transverse to the plane of movement of said pocket to retain and release cans.

17. In a can sorting mechanism for can testing machines, in combination: a revoluble series of open-sided can pockets adapted to receive cans lying on their sides; can supporting means for said pockets each adapted to enter an opening in the end of a can and support the same when its pocket is inverted; devices for holding said can supporting means in such supporting position; and means for releasing said can supporting means when the pocket is in predetermined position for the discharge of a can therefrom.

Signed in the presence of two subscribing witnesses.

LAURENCE F. DILLON.

Witnesses:
THOMAS J. O'BRIEN,
ESTHER ABRAMS.